United States Patent [19]

Martz et al.

[11] Patent Number: 4,728,317
[45] Date of Patent: Mar. 1, 1988

[54] BELT TENSIONER, PART THEREFOR AND METHODS OF MAKING THE SAME

[75] Inventors: Vernon H. Martz, Brookline; Leslie B. Wilson, Reeds Spring, both of Mo.

[73] Assignee: Dayco Products, Inc., Dayton, Ohio

[21] Appl. No.: 296,696

[22] Filed: Aug. 27, 1981

[51] Int. Cl.$^4$ .............................................. F16H 7/12
[52] U.S. Cl. .................................. 474/110; 474/136; 188/298
[58] Field of Search ............... 474/110, 109, 111, 104, 474/103, 131, 138, 132, 133, 134, 135, 136, 137, 148; 188/285, 302, 290, 298, 299; 464/180

[56] References Cited

U.S. PATENT DOCUMENTS

| | | | |
|---|---|---|---|
| 2,688,150 | 9/1954 | Roussel | 188/280 |
| 2,970,336 | 2/1961 | Webb | 188/298 |
| 2,991,992 | 7/1961 | Elsner | 188/298 |
| 3,081,846 | 3/1963 | Lift | 188/298 |
| 3,081,847 | 3/1963 | Smitley | 188/298 |
| 3,101,005 | 8/1963 | Mittag | 474/104 |
| 3,168,278 | 2/1965 | Ogden | 188/298 |
| 3,517,781 | 6/1970 | Weerd | 188/298 |
| 4,051,742 | 10/1977 | Johansson et al. | 474/110 |
| 4,094,205 | 6/1978 | Cook | 474/110 |
| 4,126,303 | 11/1978 | Yagisawa et al. | 188/298 |

FOREIGN PATENT DOCUMENTS 279415  9/1948  Switzerland .................. 474/135

OTHER PUBLICATIONS

U.S. Patent Application, Ser. No. 296,693, filed Aug. 27, 1981, of Leslie B. Wilson.

Primary Examiner—Lawrence Staab
Attorney, Agent, or Firm—Joseph V. Tassone

[57] ABSTRACT

A tensioner for a power transmission belt that is adapted to be operated in an endless path and a method of making the same are provided, the tensioner comprising a piston and cylinder unit having a cylinder member and a piston member disposed in the cylinder member, the cylinder member having a tapering chamber defining a substantially straight line tapering internal peripheral side wall of the cylinder member that extends substantially from one end thereof and to the other end thereof and carrying a rolling diaphragm for rolling against the tapering side wall throughout substantially the entire normal tensioning range of movement of the belt engaging unit of the tensioner relative to the support unit of the tensioner whereby the relative movement between the members changes the effective area of the rolling diaphragm and, thus, the tensioning force on the belt engaging unit in a substantially linear manner throughout the normal tensioning range of movement of the belt engaging unit relative to the support unit, the diaphragm having its outer periphery secured to the cylinder member intermediate the opposed ends thereof whereby the tapering chamber extends from the opposed sides of the diaphragm.

30 Claims, 7 Drawing Figures

BELT TENSIONER, PART THEREFOR AND METHODS OF MAKING THE SAME

BACKGROUND OF THE INVENTION

1. Field of the Invention

This invention relates to a tensioner for an endless power transmission belt or the like, an improved part for such a tensioner or the like as well as to methods of making such a tensioner and improved part.

2. Prior Art Statement

It is known in the art to provide a tensioner for a power transmission belt that is adapted to be operated in an endless path, the tensioner comprising a support means for being fixed relative to the belt, a belt engaging means carried by the support means and being movable relative thereto, force producing means operatively associated with the support means and the belt engaging means for urging the belt engaging means relative to the support means in a belt tensioning direction and against the belt with a force to tension the belt, and a fluid operated transmitting means operatively associated with the force producing means and the belt engaging means for translating forces therebetween whereby the force producing means is adapted to be disposed remote from the belt engaging means, the fluid operated transmitting means including a piston and cylinder means having a cylinder member and a piston member disposed in the cylinder member with one of the members being adapted to be fixed to define part of the support means with the other of the members being movable relative thereto and being operatively associated with the belt engaging means.

Examples of tensioners of the above-mentioned type are provided in the following co-pending patent application of one of the applicants of this invention and two U.S patents:

(1) U.S patent application, Ser. No. 296,693, filed Aug. 27, 1981, of Leslie B. Wilson one of the applicants of this application.
(2) U.S. Pat. No. 4,051,742—Johansson
(3) U.S. Pat. No. 4,094,205—Cook.

It appears from item (1) above that the force producing means comprises a mechanical spring unit which has the force thereof transmitted to a piston member that is interconnected to an idler pulley by a passage defining means of a fluid transmitting means, the passage defining means having a flow control valve therein to be more restrictive to the flow of fluid therethrough from the belt engaging means to the spring unit than from the spring unit to the belt engaging means for a dampening purpose.

It appears from item (2) above that a sensing unit senses slack in a belt and directs fluid pressure to a piston and cylinder unit that moves a belt engaging means in a belt tensioning direction with an increasing force, the piston and cylinder means appearing to be truly cylindrical in shape.

It appears from item (3) above that a piston and cylinder unit is utilized to tension a belt and has increasing pressure directed thereto as increased torque is provided by the belt, the piston and cylinder unit appearing to be truly cylindrical in shape.

It is also known in the art to provide a fluid operated piston and cylinder device comprising a cylinder member provided with a chamber therein, a piston member disposed in the chamber whereby one of the members is adapted to be fixed with the other of the members being movable relative thereto, the chamber of said cylinder member defining an internal peripheral side wall of the cylinder member, and a rolling diaphragm carried by the cylinder member for rolling against the peripheral side wall, the piston member being operatively associated with the rolling diaphragm.

Such a device can have the piston member contoured, the cylinder member contoured or both the piston member and the cylinder member contoured as set forth in the following U.S. patent:

(4) U.S. Pat. No. 3,168,278—Ogden.

SUMMARY OF THE INVENTION

It is one feature of this invention to provide an improved tensioner for a power transmission belt of the like.

In particular, it was found according to the teachings of the invention set forth in the co-pending patent application Ser. No. 296,694, filed Aug. 27, 1981 of Leslie B. Wilson, one of the applicants of this application, that as the belt engaging means of a belt tensioner moves in a tensioning direction under the urging force of the force producing means of the tensioner, the resulting force vectors in the engaged belt change in such a manner that an increasing tensioning force against the belt is required to compensate for this change in the force vectors of the tensioned belt. Thus, it was found according to the teachings of that invention that it was possible to arrange a mechanical spring means for a belt tensioner that will increase its urging force on the belt engaging means the further the belt engaging means moves in its belt tensioning direction. Accordingly, such copending patent application is being incorporated into this application by the above reference thereto.

It was found according to the teachings of this invention that a piston and cylinder means could be provided with a rolling diaphragm in a unique manner to cause the effective area of the rolling diaphragm to change as the same is moved to thus change the tensioning force on a belt engaging means of a belt tensioner in a manner believed to increase the tensioning force against the belt as the belt engaging means moves in a tensioning direction to compensate for the change in the force vectors of the tensioned belt.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, force producing means operatively associated with the support means and the belt engaging means for urging the belt engaging means relative to the support means in a belt tensioning direction and against the belt with a force to tension the belt, and a fluid operated transmitting means operatively associated with the force producing means and the belt engaging means for translating forces therebetween whereby the force producing means is adapted to be disposed remote from the belt engaging means, the fluid operated transmitting means including a piston and cylinder means having a cylinder member and a piston member disposed in the cylinder member. One of the members is adapted to be fixed to define part of the support means with the other of the members being movable relative thereto and be operatively associated with the belt engaging means. The cylinder member has opposed ends and a tapering chamber defining a substantially straight line tapering internal peripheral side wall of the cylinder member extends substantially completely between the opposed ends A rolling diaphragm is carried by the cylinder member for rolling against the tapering side wall throughout substantially the entire normal tensioning range of movement of the belt engaging means relative to the support means. The diaphragm means has opposed sides and an outer peripheral means secured to the cylinder member intermediate the opposed ends thereof whereby the tapering chamber extends from the opposed sides of the diaphragm. The piston member is operatively associated with the rolling diaphragm whereby the relative movement changes the effective area of the rolling diaphragm and, thus, the tensioning force on the belt engaging means in a substantially linear manner throughout the normal tensioning range of movement of the belt engaging means relative to the support means.

It is another feature of this invention to provide an improved part for such a tensioner, the improved part being the piston and cylinder means previously described.

However, it is believed that such improved fluid operated piston and cylinder device can be utilized for other purposes than for a tensioner and therefore this invention is not to be limited to a fluid operated piston and cylinder device only for a belt tensioner.

Accordingly, it is an object of this invention to provide an improved tensioner for a power transmission belt or the like, the improved tensioner of this invention having one or more of the novel features of this invention as set forth above or hereinafter shown or described.

Another object of this invention is to provide an improved method of making a tensioner for a power transmission belt or the like, the method of this invention having one or more of the novel features of this invention as set forth above or hereinafter shown or described.

Another object of this invention is to provide an improved fluid operated piston and cylinder device having one or more of the novel features of this invention as set forth above or hereinafter shown or described.

Another object of this invention is to provide an improved method of making a fluid operated piston and cylinder device, the method of this invention having one or more of the novel features of this invention as set forth above or hereinafter shown or described.

Other objects, uses and advantages of this invention are apparent from a reading of the description which proceeds with reference to the accompanying drawings forming a part thereof and wherein:

DESCRIPTION OF THE PREFERRED EMBODIMENTS

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Also, while the improved fluid operated piston and cylinder device of this invention is described and illustrated as providing part of a belt tensioner, it is to be understood that the improved fluid operated piston and cylinder device of this invention can be utilized for other purposes as desired.

Therefore, this invention is not to be limited to only the embodiment illustrated in the drawings, because the drawings are merely utilized to illustrate one of the wide variety of uses of this invention.

Figure 1:
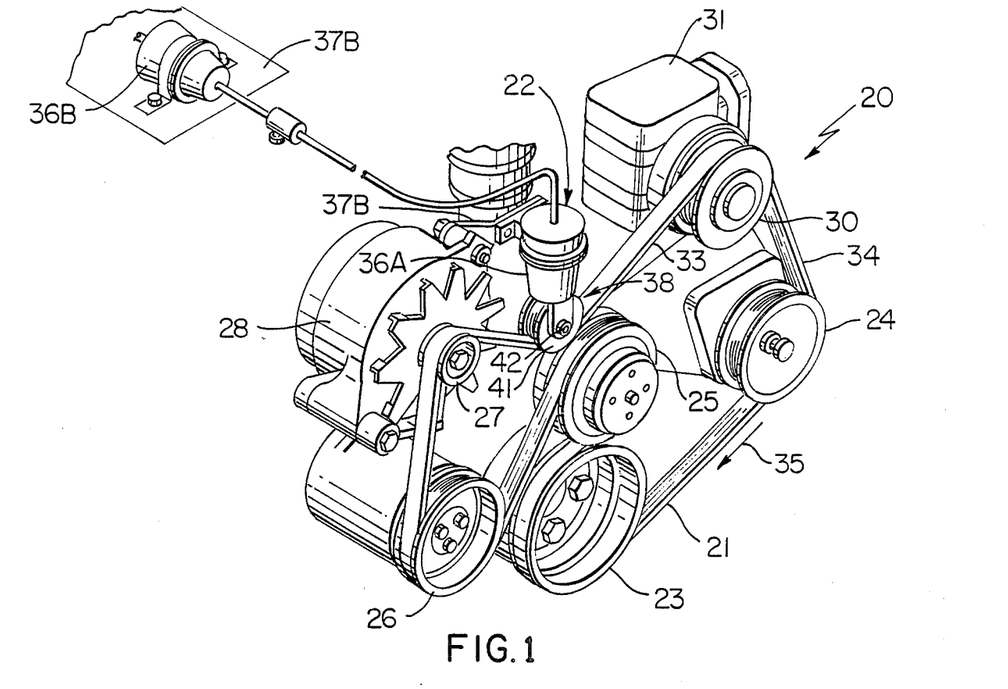
FIG. 1 is a fragmentary isometric view looking toward the front end of an automobile engine which utilizes one embodiment of the belt tensioner of this invention.
Figure 2:
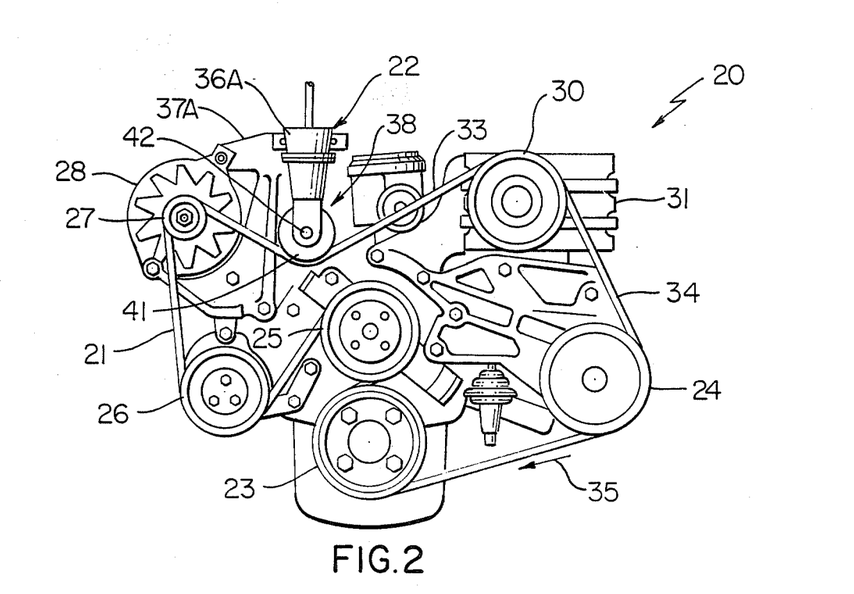
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permites the tensioner 21 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produces variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31.

In addition, it is believed that the improved belt tensioner 22 of this invention, while providing the above functions, is relatively small and compact because the same has a part thereof disposed remote from the belt 21 so that the remaining part of the belt tensioner 22 of this invention that is disposed adjacent the belt 21 does not take up a large amount of space as is required for prior known belt tensioners whereby the improved belt tensioner 22 of this invention will now be described.

Figure 3:
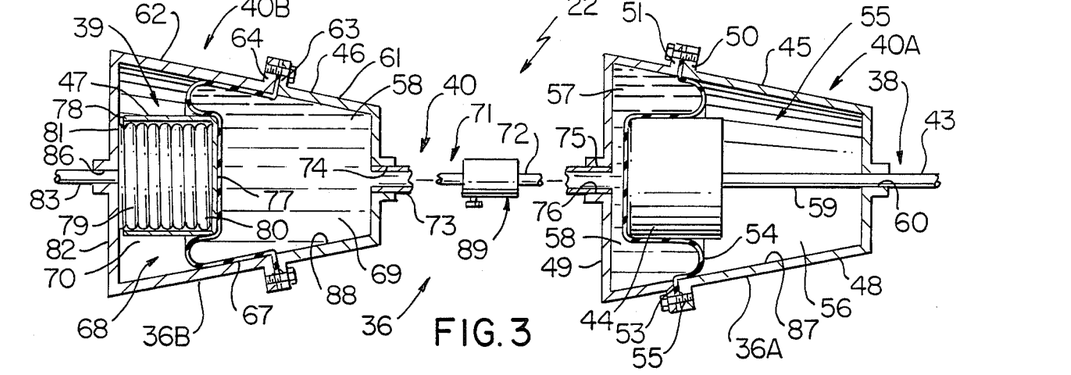
FIG. 3 is a schematic view partially in cross-section illustrating a part of the belt tensioner of FIGS. 1 and 2.

As best illustrated in FIG. 3, the improved belt tensioner 22 of this invention comprises a support means that is generally indicated by the reference numeral 36 and comprises two parts 36A and 36B, the support means 36A being adapted to be fixed in any suitable manner to a mounting bracket 37A of the engine 20 as illustrated in FIGS. 1 and 2, while the support means 36B is adapted to be mounted to a bracket 37B located anywhere that is desired and remote from the bracket 37A as schematically illustrated in FIG. 1 so that the support means 36B does not take up any room adjacent the belt 21 for the reasons set forth in the aforementioned copending patent application, Ser. No. 296,693, filed Aug. 27, 1981 of Leslie B. Wilson and such patent application is being incorporated into this application by this reference thereto.

A belt engaging means that is generally indicated by the reference numeral 38 is movably carried by the support means 36A in a manner hereinafter set forth and thereby forms part of the tensioner 22 of this invention.

The tensioner 22 has mechanical spring means that is generally indicated by the reference numeral 39 operatively associated with the support means 36B and the belt engaging means 38 in a manner hereinafter set forth to tend to urge the belt engaging means 38 against the slack side 33 of the belt 21 in substantially a true vertically downwardly direction in a manner to substantially bisect the angle made by the belt 21 between the sheaves 27 and 30 as illustrated in FIG. 2, the spring means 39 being carried by the support means 36B in a manner hereinafter set forth so as to also be disposed remote from the belt 21.

The belt tensioner 22 also includes a fluid operated transmitting means that is generally indicated by the reference numeral 40 and is operatively associated with the spring means 39 and the belt engaging means 38 to translate motion therebetween in a manner hereinafter set forth whereby the spring means 39 is adapted to be disposed remote from the belt engaging means 38.

The belt engaging means 38 includes an idler pulley 41 rotatably mounted on an axle 42 carried in any suitable manner by an end 43 of a piston member 44 that is adapted to reciprocate in a cylinder member 45, the cylinder member 45 comprising the support means 36A that is secured to the bracket 37A of the engine 20 whereby the cylinder member 45 is adapted to be stationary while the piston member 44 is movable relative thereto.

The cylinder member 45 and piston member 44 define part of the fluid operated transmitting means 40 as will be apparent hereinafter and thereby comprise a fluid operated piston and cylinder means or device that is generally indicated by the reference numeral 40A.

The support means 36B also comprises a cylinder member 46 having a piston member 47 whereby the cylinder member 46 and piston member 47 also define part of the fluid operated transmitting means 40 as will be apparent hereinafter and thereby comprise a fluid operated piston and cylinder means or device that is generally indicated by the reference numeral 40B.

The cylinder member 45 of the piston and cylinder means 40A is formed of two cup-shaped parts 48 and 49 secured together at their adjacent open ends 50 and 51 by fastening means 52 which also secures the outer peripheral portion 53 of a rolling diaphragm 54 therebetween, the diaphragm 54 cooperating with the cylinder member 45 to divide the resulting chamber 55 therein into two chamber sections 56 and 57 that are sealed from each other by the rolling diaphragm 54.

The piston member 44 is disposed in the chamber section 56 of the cylinder member 45 while a fluid 58 is disposed in the chamber section 57 for a purpose hereinafter described, the piston member 44 having a piston rod 59 extending therefrom and out through an opening 60 in the cylinder member 45 to define the part 43 of the piston member 44 that is interconnected to the idler pulley 41.

The piston and cylinder means 40B also has its cylinder member 46 formed of two cup-shaped parts 61 and 62 secured together at their adjacent open ends 63 and 64 by fastening means 65 which also secure an outer peripheral portion 66 of a rolling diaphragm 67 therebetween whereby the rolling diaphragm 67 divides the resulting chamber 68 in the cylinder member 46 into two chamber sections 69 and 70 that are sealed from each other by the rolling diaphragm 67.

The piston member 47 of the piston and cylinder means 40B is disposed in the chamber section 70 while a fluid 58 is disposed in the chamber section 69 and is fluidly interconnected to the chamber section 57 of the piston and cylinder means 40A by a passage defining means 71 that comprises a conduit means 72 having one end 73 thereof secured in an opening 74 in the cylinder member 46 and the other end 75 thereof secured in an opening 76 in the cylinder member 45.

The piston member 47 of the piston and cylinder means 40B is substantially cup-shaped with a closed end 77 disposed against the rolling diaphragm 67 and having the open end 78 thereof receiving part of the spring means 39 therein.

In particular, the spring means 39 illustrated in the drawings comprises a coiled compression spring 79 having one end 80 bearing against the closed end 77 of the piston member 47 while the other end 81 thereof bears against an end wall 82 of the cylinder member 46 whereby the force of the spring means 79 urges the piston member 47 and, thus, the rolling diaphragm 67 to the right in FIGS. 3 and 4 for a purpose hereinafter described, the piston member 47 having a spring guide rod 83 telescoped within the spring 79 and having one end 84 thereof carried by the end wall 77 of the piston member 47 while another end 85 of the spring guide rod 83 passes through an opening 86 in the end wall 82 of the cylinder member 46 to permit the movement of the piston member 47 between the two extreme positions illustrated respectively in FIGS. 3 and 4 for a purpose hereinafter described.

While a compression spring 79 has been illustrated as providing the mechanical spring means 39 of this invention, it is to be understood that any type of spring means can be utilized as this invention is not to be limited to the particular spring means 79 illustrated in the drawings.

The cylinder members 45 and 46 of the piston and cylinder means 40A and 40B are uniquely formed so that the resulting chambers 55 and 68 thereof are tapering chambers that respectively define internal peripheral tapering side walls 87 and 88 against which the rolling diaphragms 54 and 67 will roll, the tapering side walls 87 and 88 defining substantially frustro-conical internal surfaces in the respective cylinders 45 and 46 as illustrated.

Thus, it can be seen that the internal peripheral side wall 87 of the cylinder member 45 tapers in a reducing substantially straight line manner from the chamber section 57 to the chamber section 56 thereof while tapering side wall 88 tapers in a reducing substantially straight line manner from the chamber section 70 thereof to the chamber section 69 thereof.

In this manner, as the rolling diaphragm 54 of the piston and cylinder means 40A rolls from left to right in FIGS. 3 and 4, the effective area of the rolling diaphragm 54 decreases in size so that the force of the fluid pressure 58 acting thereon in a manner hereinafter set forth effectively increases in a substantially linear manner on the piston member 44 tending to oppose such movement of the rolling diaphragm 54 the further the piston member 44 is moved in a belt tensioning direction for a purpose hereinafter described.

Figure 4:
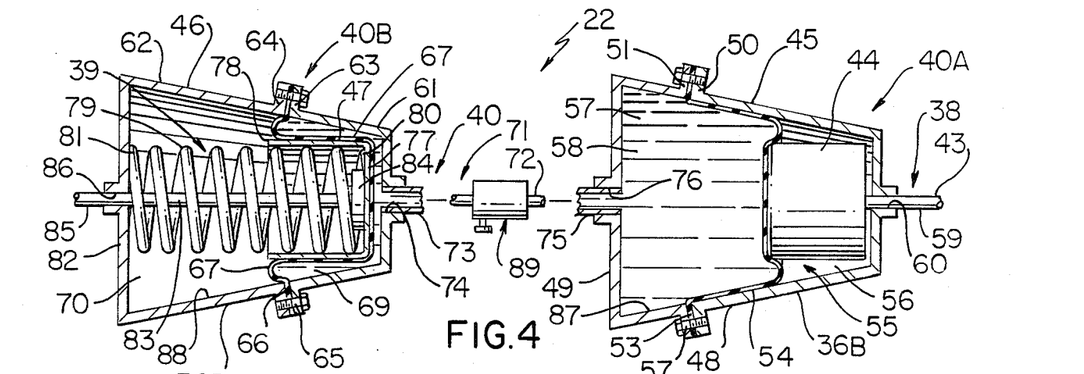
FIG. 4 is a view similar to FIG. 3 and illustrates the belt tensioner in another operating condition thereof.

Similarly, as the rolling diaphragm 67 of the piston and cylinder means 40B is moved from left to right as illustrated in FIGS. 3 and 4 by the force of the spring means 39, the effective surface area of the rolling diaphragm 67 on the fluid 58 in the chamber section 69 decreases so that the force of the spring means 39 can create an increasing force of fluid from the chamber section 69 through the passage defining means 71 to the chamber 58 of the piston and cylinder means 40A in a substantially linear manner. In particular, it is well known that as a coil spring means expands, the force thereof progressively decreases. However, since the piston and cylinder means 40B is decreasing the effective area of the rolling diaphragm 67 as the spring 79 expands, it is believed that the piston and cylinder means 40B can be designed so that the same provides a constant pressure output, an increasing pressure output or a decreasing pressure output throughout the entire range of movement of the spring means 79 in its expanding direction for a purpose hereinafter described.

Thus, it is believed that the piston and cylinder means 40A can also be so designed that the same will provide a progressively increasing force on the piston member 44 as the rolling diaphragm 54 thereof moves from left to right as illustrated in FIGS. 3 and 4 for a purpose hereinafter described.

While it is preferred that the fluid 58 utilized in the tensioner 22 of this invention comprise a hydraulic oil, it is to be understood that the same can comprise any suitable liquid or even suitable gas or gases as desired.

Thus, it can be seen that the fluid operated transmitting means 40 translates movement between the piston members 47 and 44 by the fluid 58 for a purpose hereinafter described.

The conduit means 72 of the fluid operated transmitting means 40 of this invention has a flow control valve means disposed therein that is generally indicated by the reference numeral 89 and can be of any conventional form well known in the art. One typical flow control valve means 89 that can be utilized is illustrated in FIG. 5 and will be hereinafter described.

However, it is to be understood that the flow control valve means 89 can be a fixed flow control means, an adjustable flow control means and even be adapted to close the passage defining means 72 to substantially lock the idler pulley 41 in a set position relative to the support means 36A as will be apparent hereinafter.

Figure 5:
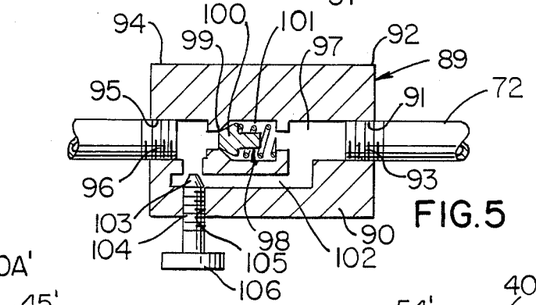
FIG. 5 is a schematic view illustrating a flow control valve means utilized in the belt tensioner of FIGS. 3 and 4.

As illustrated in FIG. 5, the flow control valve means 89 comprises a housing means 90 having an opening 91 at one end 92 thereof and receiving an end 93 of the conduit means 72 that leads from the cylinder member 45, the conduit end 93 being secured in the opening 91 in any suitable manner. Similarly, the other end 94 of the housing member 90 has an opening 95 receiving an end 96 of the conduit means 72 that leads from the cylinder member 46, the end 96 of the conduit means 72 being secured in the opening 95 in any suitable manner.

The housing member 90 of the flow control valve means 89 has a first passage 97 extending between the openings 91 and 95 thereof and contains a one-way check valve means 98 therein in a manner to prevent fluid flow through the passage 97 from the opening 91 to the opening 95 while permitting full and unrestricted fluid flow from the opening 95 to the opening 91 through the passage 97.

In particular, the one-way valve means 98 includes a valve seat 99 in the passage 97 adapted to be opened and closed by a valve member 100 urged toward its closed position by a compression spring 101 in a manner well known in the art. Thus, when fluid tends to flow from the opening 91 to the opening 95 through the passage 97, the check valve member 100 closes against the valve seat 99 to prevent such fluid flow. However, when there is a fluid flow from the opening 95 to the opening 91 through the passage 97, the fluid acts against the valve member 100 and moves the same to the left in FIG. 5 in opposition to the force of the spring 101 to open the valve seat 99 and thereby flow to the opening 91 in an unrestricted manner.

The housing member 90 of the flow control valve means 89 has a second passage 102 therein extending between the openings 91 and 95 thereof in a parallel relation to the first passage 97, the passage 102 having the amount of fluid flow therethrough controlled by an adjustable valve member 103 in a manner well known in the art. The adjustable valve member 103 has an externally threaded portion 104 threadedly adjusted by an operator turning a knob-like end 106 of the adjusting member 103 in a manner well known in the art.

Thus, it can be seen that when the fluid flows through the passage defining means 71 from the cylinder member 45 to the cylinder member 46, and thus, from the opening 91 to the opening 95 of the valve housing 90, the check valve means 98 closes the passage 97 so that the entire fluid flow is through the passage 102 in a restricted manner as determined by the position of the valve member 103. Conversely, when the fluid flow through the passage defining means 71 is from the cylinder member 46 to the cylinder member 45 and, thus, from the opening 95 to the opening 91 of the valve housing 90, the one-way check valve means 98 is opened so that full and unrestricted fluid flow is created between the cylinder members 46 and 45 for a purpose hereinafter described.

However, it is to be understood that the fluid flow from the cylinder member 46 to the cylinder member 45 could also be controlled by a flow control valve means if desired, for a purpose hereinafter described.

Therefore, it can be seen that it is a relatively simple method of this invention to form the belt tensioner 22 of this invention to operate in a manner now to be described.

The tensioner 22 of this invention is initially mounted to the engine 20 by securing the support means 36B in a remote manner to the bracket means 37B and by securing the support means 36A to the bracket 37A so that the idler pulley 41 is in engagement against the stationary belt 21 with the piston member 44 having its end disposed at its closest position to the left hand end wall of the cylinder member 45 as illustrated in FIG. 3 in order to allow full movement of the piston member 44 relative to the cylinder member 45 a distance that is required for normal take up movement of the idler pulley 41 on the belt 21 in a tensioning direction of the tensioner 22.

In this manner, the fluid 58 displaced from the chamber section 57 to the chamber section 69 has positioned the piston 47 to its closest position to the end wall 83 so that the spring 79 is in its most compressed condition and stores spring energy in a manner to tend to move the piston member 47 away from the end wall 82 toward the end and, thus, to move the idler pulley 41 towards the belt 21 whereby the initial tensioning force of the idler pulley 41 on the belt 21 is provided by the spring means 39 in its initial compressed condition, the fluid operated transmitting means 40 translating the spring force to the idler pulley 41 by the force of the piston member 47 tending to force the liquid 58 in the chamber section 69 thereof to the chamber section 57 of the cylinder member 45.

Thus, it can be seen that once the initial position of the tensioner 22 has been established so that the spring means 39 is under the desired amount of compression, the force of the spring means 39 tends to urge the belt engaging means 38 in its tensioning direction against the belt 21 with a force determined by the initial compressed condition of the spring 79 in the at rest position of the engine 20.

Thereafter, each time the engine 20 is initially started so as to cause slack in the slack side 33 of the belt 21 and a tightening in the tight side 34 thereof, the force of the spring means 39 causes the idler pulley 41 to move inwardly to take up the slack of the belt 21 on the slack side 33 thereof and provide a tensioning force thereof as determined by the force of the spring 79 and the effective area of the diaphragm 54, such inward movement of the pulley 41 being caused by the piston member 47 of the cylinder member 46 moving to the right in FIG. 3 under the force of the spring 79 to roll the diaphragm 67 and displace a certain amount of liquid 58 in the chamber section 69 through the passage defining means 71 to the chamber section 57 of the cylinder member 45 to thereby act on the rolling diaphragm 54 and roll the same to the right in FIG. 3 to drive the piston member 44 into the belt 21. Such flow of liquid 58 through the passage defining means 71 is unrestricted in the manner previously set forth so that such inward movement of the idler pulley 41 in a tensioning direction is unrestricted. However, it is to be understood that the movement of the idler pulley 41 in a tensioning direction could be dampened by restricting the flow through the passage defining means 71 in its tensioning direction if desired for the reasons fully set forth in the aforementioned copending patent applications.

Thus, it can be seen that as the belt 21 is traveling in the direction of the arrow 35 in FIGS. 1 and 2 by the running engine 20, any vibrations and oscillations of the belt 21, such as caused by the turning on and off of the air conditioning compressor 31 as previously set forth, will cause an up and down oscillation of the portion 33 of the belt 21 which movement is imposed on the idler pulley 41 of the tensioner 22.

In those instances where the deflection of the portion 33 of the belt 21 is upwardly in FIGS. 1 and 2 to tend to cause the pulley 41 to move upwardly relative to the support means 36A, such movement causes the piston 44 to tend to move upwardly in the cylinder member 45 in FIGS. 1 and 2 and force a certain amount of liquid 58 in the chamber section 57 through the passage defining means 71 to the chamber section 69 and move the piston 47 to the left in FIG. 3 to further compress the spring 79. However, such flow of fluid 58 from the chamber section 57 of the cylinder member 45 to the chamber section 69 of the cylinder member 46 is restricted by the flow control valve means 89 as such flow of fluid must pass through the restricted passage 102 of the flow control valve means 89 as previously set forth whereby the upward movement of the idler pulley 41 relative to the belt 21 is dampened with a greater restricting force than the dampening effect produced by the flow control valve means 89 in the movement of the idler pulley 41 in a tensioning direction.

In this manner, it is believed that the fluid operated transmitting means 40 of this invention will produce a dampening effect on the movement of the idler pulley 41 which will prolong the life of the tensioner 22 so that rapid oscillations of the spring means 39 cannot take place and the spring means 39 will perform its tensioning function in a relatively smooth manner while being disposed remote from the idler pulley 41 to save space in the region of the belt 21 of the engine 20 and provide through the device 40A an increasing tensioning force as the idler pulley 41 moves in its tensioning direction as previously described.

In particular, since the restrictive passage means 102 of the flow control means 89 in combination with the nonrestrictive passage means 97 provides a preferential flow ratio that can be controlled or can be built into the tensioner 22, the tensioner 22 will deliver increased tension on the belt 21 when the belt 21 is subjected to acceleration and/or heavy cyclic loads commonly encountered in belt drive systems. Accordingly, if the fluid flow from the chamber section 57 to the chamber section 69 is more restrictive than reverse flow, load fluctuations in the belt system will result in the idler pulley 41 being moved down into the belt 21 more rapidly than movement of the idler pulley 41 upwardly relative to the belt 21. In this manner, the tensioner 22 will deliver greater tension when the system demands and less tension when less tension is required. This can result in increased bearing life in belt driven accessories, reduced belt slippage under heavy loading conditions and an increased effective life of the tensioner 22 itself.

It is to be understood that while the tensioner 22 of this invention has been described as operating with a liquid 58 disposed in the fluid operated transmitting means 40 thereof, the fluid operated transmitting means 40 could utilize air or other suitable gases as desired because the tensioner 22 would operate in a similar manner whereby the transmitting means is described and claimed as a fluid operated transmitting means. Also, while the piston and cylinder means 40A and 40B respectively have been illustrated and described as having the cylinder member 45 and 46 held stationary, it is to be understood that the piston member 44 of the means 40A could be stationary while the cylinder member 45 is made movable relative thereto and has the idler pulley 41 carried thereby and/or the piston member 47 of the means 40B could be stationary while the cylinder member is made movable relative thereto.

While the piston and cylinder means 40A previously described has the taper of the side wall 87 decrease in size from the chamber section 57 to the chamber section 56 to produce an increasing force on the piston 44 as the piston 44 is moved to the right in FIG. 3 by the rolling diaphragm 54, it is to be understood that the taper could be in the reverse direction so that a progressively decreasing force will be provided by the piston member 44 moving to the right under the force of the rolling diaphragm 54.

Figure 6:
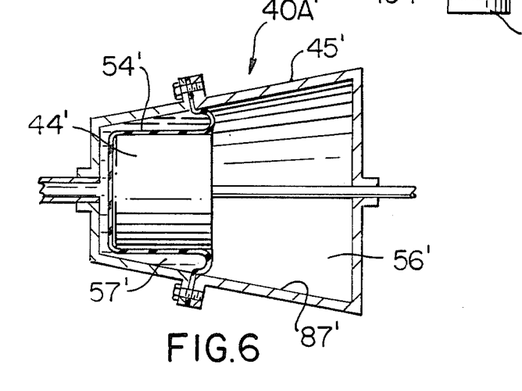
FIG. 6 is a fragmentary view illustrating another embodiment of a fluid operated piston and cylinder device of this invention that can be utilized in the belt tensioner of FIGS. 3 and 4, if desired.
Figure 7:
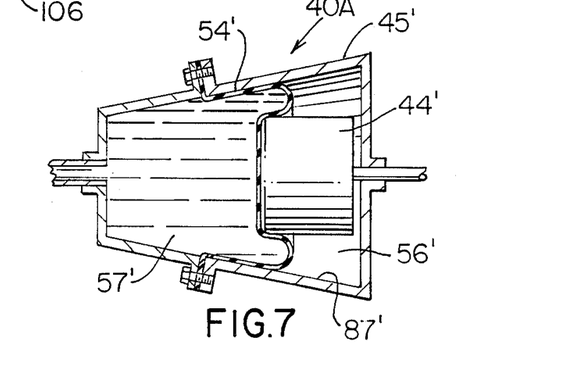
FIG. 7 is a view similar to FIG. 6 and illustrates the device of FIG. 6 in another operating condition thereof.

For example, reference is now made to FIGS. 6 and 7 wherein another fluid operated piston and cylinder device of this invention is generally indicated by the reference numeral 40A' and parts thereof similar to the device 40A are indicated by like reference numerals followed by a prime mark.

As illustrated in FIGS. 6 and 7, the cylinder member 45' has the internal peripheral side wall 87' thereof provided with the smaller end thereof to the left so that the tapering side wall 87' increases in size from the chamber section 57' to the chamber section 56' as the rolling diaphragm 54' rolls from left to right as illustrated in FIGS. 6 and 7 so as to produce a decreasing force on the piston member 44'.

Thus, it can be seen that this invention provides a fluid operated piston and cylinder device which is believed will produce a nearly linear, increasing or decreasing force output when subjected to a constant pressure input. The same device when used in the reverse mode will produce a nearly linear, increasing or decreasing pressure output when subjected to a constant force input. This unique feature is accomplished by the use of a tapered internal peripheral side wall in the cylinder member so that as the piston transverses the tapered chamber of the cylinder member, the effective area of the rolling diaphragm increases or decreases, depending upon the direction of taper. Therefore, a constant pressure input will develop an increasing or decreasing force output as the piston transverses the tapered side wall of the cylinder member. Conversely, a constant force input will result in a variable pressure output.

Such a fluid operated piston and cylinder device could be used in conjunction with a spring mechanism, such as the spring means 39 previously described with the angle of the taper of the side wall being selected to compensate for the spring rate. In particular, as a spring expands, its force decreases but the effective area of the piston diaphragm can be arranged to decrease so that the pressure output can remain constant, increase or decrease according to the relationship of the spring rate and bore taper.

Therefore, it can be seen that this invention not only provides an improved belt tensioner and a method of making the same, but also this invention provides an improved fluid operated piston and cylinder device and a method of making the same.

While the forms and methods of this invention now preferred have been illustrated and described as required by the Patent Statute, it is to be understood that other forms and method steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, force producing means operatively associated with said support means and said belt engaging means for urging said belt engaging means relative to said support means in a belt tensioning direction and against said belt with a force to tension said belt, and a fluid operated transmitting means operatively associated with said force producing means and said belt engaging means for translating forces therebetween whereby said force producing means is adapted to be disposed remote from said belt engaging means, said fluid operated transmitting means including a piston and cylinder means having a cylinder member and a piston member disposed in said cylinder member, one of said members being adapted to be fixed to define part of said support means with the other of said members being movable relative thereto and being operatively associated with said belt engaging means, the improvement wherein said cylinder member has opposed ends and a tapering chamber defining a substantially straight line tapering internal peripheral side wall of said cylinder member that extends substantially completely between said opposed ends, and a rolling diaphragm carried by said cylinder member for rolling against said tapering side wall throughout substantially the entire normal tensioning range of movement of said belt engaging means relative to said support means, said diaphragm having opposed sides and an outer peripheral means secured to said cylinder member intermediate said opposed ends thereof whereby said tapering chamber extends from said opposed sides of said diaphragm, said piston member being operatively associated with said rolling diaphragm whereby said relative movement changes the effective area of said rolling diaphragm and, thus, the tensioning force on said belt engaging means in a substantially linear manner throughout substantially the normal tensioning range of movement of said belt engaging means relative to said support means.

2. A tensioner as set forth in claim 1 wherein said piston and cylinder means is arranged to increase the tensioning force on said belt engaging means as said belt engaging means moves in said belt tensioning direction relative to said support means throughout the entire normal tensioning range of movement of said belt engaging means relative to said support means.

3. A tensioner as set forth in claim 1 wherein said rolling diaphragm divides said chamber into two sections, said piston member being disposed in one of said sections, and a fluid being disposed in the other of said sections.

4. A tensioner as set forth in claim 3 and including spring means disposed in said one section and acting on said piston member to urge said rolling diaphragm toward said other section.

5. A tensioner as set forth in claim 4 wherein said side wall of said cylinder member tapers in a reducing manner from said one section to said other section.

6. A tensioner as set forth in claim 5 wherein said piston and cylinder means comprises said force producing means.

7. A tensioner as set forth in claim 3 wherein said side wall of said cylinder member tapers in a reducing manner from said other section to said one section.

8. A tensioner as set forth in claim 7 wherein said one of said members is interconnected to said belt engaging means and thereby defines part of said belt engaging means.

9. A tensioner as set forth in claim 1 wherein said piston and cylinder means comprises said force producing means.

10. A tensioner as set forth in claim 1 wherein said one of said members is interconnected to said belt engaging means and thereby defines part of said belt engaging means.

11. A tensioner as set forth in claim 10 wherein said force producing means comprises another piston and cylinder means having a cylinder member and a piston member disposed in said cylinder member, one of said members of said other piston and cylinder means being adapted to be fixed to define part of said support means with the other of said members of said other piston and cylinder means being movable relative thereto and being operatively associated with said other member that is operatively associated with said belt engaging means by said fluid operated transmitting means.

12. A tensioner as set forth in claim 11 wherein said fluid operated transmitting means includes a passage defining means extending between said other members to fluidly interconnect said other members together.

13. A tensioner as set forth in claim 12 wherein said fluid operated transmitting means has a flow control device for controlling the flow rate of fluid through said passage defining means in at least one direction of flow therethrough.

14. A tensioner as set forth in claim 13 wherein said one direction of flow of fluid through said passage defining means is from the first mentioned piston and cylinder means to said other piston and cylinder means.

15. In a method of making a tensioner for a power transmission belt that is adapted to be operated in an endless path, said method comprising the steps of providing a support means for being fixed relative to said belt, providing a belt engaging means carried by said support means and being movable relative thereto, operatively associating force producing means with said support means and said belt engaging means for urging said belt engaging means relative to said support means in a belt tensioning direction and against said belt with a force to tension said belt, operatively associating a fluid operated transmitting means with said force producing means and said belt engaging means for translating forces therebetween whereby said force producing means is adapted to be disposed remote from said belt engaging means, forming said fluid operated transmitting means to include a piston and cylinder means having a cylinder member and a piston member disposed in said cylinder member, and forming one of said members to be adapted to be fixed to define part of said support means with the other of said members being movable relative thereto and being operatively associated with said belt engaging means, the improvement comprising the steps of forming said cylinder member to have opposed ends and a tapering chamber defining a substantially straight line tapering internal peripheral side wall of said cylinder member that extends substantially completely between said opposed ends, securing an outer peripheral means of a rolling diaphragm to said cylinder member intermediate said opposed ends thereof for rolling against said tapering side wall throughout substantially the entire normal tensioning range of movement of said belt engaging means relative to said support means whereby said tapering chamber extends from the opposed sides of said diaphragm, and operatively associating said piston member with said rolling diaphragm whereby said relative movement changes the effective area of said rolling diaphragm and, thus, the tensioning force on said belt engaging means in substantially a linear manner throughout substantially the entire normal tensioning range of movement of said belt engaging means relative to said support means.

16. A method of making a tensioner as set forth in claim 15 and including the step of forming said piston and cylinder means to increase the tensioning force on said belt engaging means as said belt engaging means moves in said belt tensioning direction relative to said support means throughout the entire normal tensioning range of movement of said belt engaging means relative to said support means.

17. A method of making a tensioner as set forth in claim 15 and including the step of disposing said rolling diaphragm to divide said chamber into two sections, disposing said piston member in one of said sections, and disposing a fluid in the other of said sections.

18. A method of making a tensioner as set forth in claim 17 and including the step of disposing spring means in said one section to act on said piston member to urge said rolling diaphragm toward said other section.

19. A method of making a tensioner as set forth in claim 18 and including the step of forming said side wall of said cylinder member to taper in a reducing manner from said one section to said other section.

20. A method of making a tensioner as set forth in claim 19 and including the step of forming said piston and cylinder means to comprise said force producing means.

21. A method of making a tensioner as set forth in claim 17 and including the step of forming said side wall of said cylinder member to taper in a reducing manner from said other section to said one section.

22. A method of making a tensioner as set forth in claim 21 and including the step of interconnecting said one of said members to said belt engaging means so that the same thereby defines part of said belt engaging means.

23. A method of making a tensioner as set forth in claim 15 and including the step of forming said piston and cylinder means to comprise said force producing means.

24. A method of making a tensioner as set forth in claim 16 and including the step of interconnecting said one of said members to said belt engaging means so that the same thereby defines part of said belt engaging means.

25. A method of making a tensioner as set forth in claim 24 and including the steps of forming said force producing means to comprise another piston and cylinder means having a cylinder member and a piston member disposed in said cylinder member, and forming one of said members of said other piston and cylinder means to be adapted to be fixed to define part of said support means with the other of said members of said other piston and cylinder means being movable relative thereto and being operatively associated with said other member that is operatively associated with said belt engaging means by said fluid operated transmitting means.

26. A method of making a tensioner as set forth in claim 25 and including the step of forming said fluid operated transmitting means to include a passage defining means extending between said other members to fluidly interconnect said other members together.

27. A method of making a tensioner as set forth in claim 26 and including the step of forming said fluid operated transmitting means with a flow control device for controlling the flow rate of fluid through said passage defining means in at least one direction of flow therethrough.

28. A method of making a tensioner as set forth in claim 27 and including the step of forming said one direction of flow of fluid through said passage defining means to be from the first mentioned piston and cylinder means to said other piston and cylinder means.

29. A tensioner as set forth in claim 1 wherein said cylinder member comprises two cup-shaped members respectively having open ends secured together with said outer peripheral means of said diaphragm being disposed therebetween.

30. A method of making a tensioner as set forth in claim 15 and including the steps of forming said cylinder member to comprise two cup-shaped members respectively having open ends, and securing said open ends together with said outer peripheral means of said diaphragm being disposed therebetween.

* * * * *